E. SCHNEIDER.
FLEXIBLE SHAFT FOR MOVING PICTURE CAMERAS.
APPLICATION FILED MAY 22, 1915.
1,270,061.
Patented June 18, 1918.
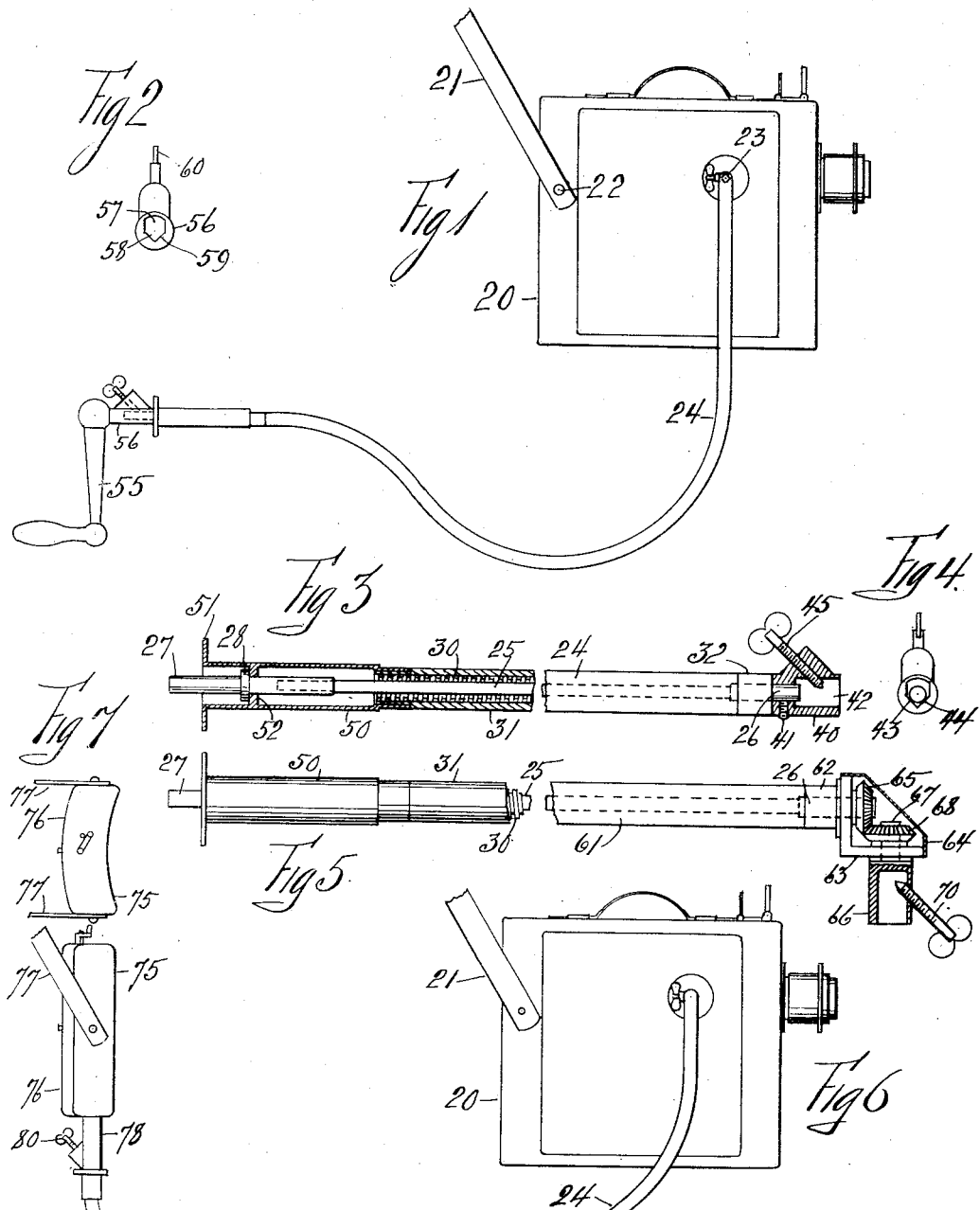

UNITED STATES PATENT OFFICE.

EBERHARD SCHNEIDER, OF NEW YORK, N. Y.

FLEXIBLE SHAFT FOR MOVING-PICTURE CAMERAS.

1,270,061.   Specification of Letters Patent.   Patented June 18, 1918.

Application filed May 22, 1915. Serial No. 29,727.

*To all whom it may concern:*

Be it known that I, EBERHARD SCHNEIDER, a citizen of the United States and a resident of the borough of Manhattan, in the county of New York and State of New York, have invented certain new and useful Improvements in Flexible Shafts for Moving-Picture Cameras, of which the following is a specification.

This invention relates to flexible shafts for moving picture cameras.

Moving picture cameras are often used without tripods so that they may be tilted at various angles to photograph objects. In such cases it becomes desirable to rotate the driving mechanism by other means than the usual crank handle, and in this invention I have shown a flexible shaft with appurtenances which can be detachably connected to the said driving mechanism.

In the drawings Figure 1 represents a side elevation of a camera with the invention connected thereto; Fig. 2 is an enlarged end view of a detail, Fig. 3 shows an enlarged side view and partial axial section of the flexible shaft; Fig. 4 is a right hand end view of Fig. 3; Fig. 5 shows a side view of a modification of the flexible shaft and its appurtenances, Fig. 6 represents a side view of a camera with a modification of the invention and Fig. 7 is a top view of a portion of Fig. 6.

A camera is indicated in its entirety at 20, and is supported by means of a strap with ends like 21, which are secured to the camera by means of pins 22. The end of the driving shaft for the mechanism of the camera is indicated at 23. A flexible shaft 24 is shown with the inner driving member 25, which is made with the usual inner core of wires, and strands of wire wound around said core. One end of the inner member 25 has fastened thereto a cap 26, and the other end has fastened thereto a cap 27 having extending therefrom a collar 28. A flexible metallic tube 30 surrounds the inner member 25. A rubber tube 31 surrounds the tube 30 and preferably has its ends secured to the latter. A ferrule 32 caps one end of the rubber tube 31. A coupling 40 abuts against the outer face of the ferrule 32 and is fastened to one end of the cap 26, by means of the screw 41. The said coupling 40 has a cavity 42, with the inclined lower faces 43, 44, and a clamping screw 45 extends through the crown of said cavity 42 at an angle to the axial line of the coupling 40, to clamp the driving shaft 23 of the camera. A sleeve handle 50 engages the other end of the rubber tube 31, and has formed at its outer end the flange 51. An inner flange 52 is formed in said sleeve handle. The collar 28 of the cap 27 abuts against the flange 52. To the outer end of the cap 27 which extends out of the sleeve handle 50 is fastened the operating handle designated in its entirety by the numeral 55. The handle 55 has formed therewith the barrel 56 in which is formed a cavity 57 with the inclined lower faces 58, 59, and a clamping screw 60 extending through the crown of said barrel 56, clamps the cap 27. Referring to Fig. 5, a modified form of flexible shaft 61 is shown. It comprises the rubber tube 31, inner member 25, and caps 26 and 27, tube 30, and sleeve handle 50 as already described. A ferrule 62 has formed therewith a knee journal bracket 63 which has attached thereto a cover 64. A bevel gear 65 is fastened to the cap 26 and is adjacent to one leg of the knee bracket. A coupling 66 similar to 40 has extending therefrom a pin 67, which is journaled in the second leg of the knee bracket and has fastened thereto the bevel gear 68, which meshes with the bevel gear 65. The coupling 66 has a cavity similar to the cavity in the coupling 40. A binding screw 70 enables the coupling 60 to be clamped to the driving shaft 23 of the camera.

In Fig. 6 the camera 20 is again shown with the strap having the ends 21, and flexible shaft 24, but instead of the operating handle 55 there is substituted a motor contained in the casing having the concaved wall 75 and convex wall 76. A strap with ends 77 supports the said casing. A barrel 78 similar to 56 is formed with said motor and can be clamped to the accompanying plug of the flexible shaft 24 by means of the binding screw 80. The concave side 75 of the casing of the motor bears against the body of the operator when in use.

To use the invention and referring to Fig. 1 the strap with the ends 21 is supported on the shoulders of the operator and he locates the camera in any desired position. An assistant holds the sleeve handle 50 with one hand and turns the operating handle 55 with the other and thereby the driving shaft 23 of the camera is turned. The flexible shaft 61 is used in a similar manner, the bevel gears 64, 65 allowing the flexible shaft to take a direction parallel and close to the casing of the camera. The modification shown in Fig. 6 enables a motor to drive the inner member of the flexible shaft 24 instead of requiring an assistant to turn an operating handle.

Having described my invention what I desire to secure by Letters Patent and claim is:

1. In combination with a cinematograph, a flexible operating shaft therefor and means for turning said shaft independent of the cinematograph.

2. In combination with a cinematograph, a flexible operating shaft therefor, a handle connected for turning said shaft and otherwise mounted independently of the cinematograph.

Signed at the borough of Manhattan, in the county of New York and State of New York, this 8th day of May, A. D. 1915.

EBERHARD SCHNEIDER.

Witnesses:
A. A. DE BONNEVILLE,
ALBERT M. BRODSKY.